(12) United States Patent
Gerber et al.

(10) Patent No.: US 8,611,825 B2
(45) Date of Patent: Dec. 17, 2013

(54) METHOD AND APPARATUS FOR PROVIDING A DYNAMIC INACTIVITY TIMER IN A WIRELESS COMMUNICATIONS NETWORK

(75) Inventors: Alexandre Gerber, Madison, NJ (US); Zhuoqing Mao, Ann Arbor, MI (US); Feng Qian, Ann Arbor, MI (US); Subhabrata Sen, New Providence, NJ (US); Oliver Spatscheck, Randolph, NJ (US); Zhaoguang Wang, Ann Arbor, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 177 days.

(21) Appl. No.: 12/946,265

(22) Filed: Nov. 15, 2010

(65) Prior Publication Data

US 2012/0122405 A1    May 17, 2012

(51) Int. Cl.
*H04B 17/00* (2006.01)
(52) U.S. Cl.
USPC .......................................... 455/67.11; 370/311

(58) Field of Classification Search
USPC ......... 455/67.11, 343.1–5, 454; 370/311, 350
See application file for complete search history.

(56) References Cited

U.S. PATENT DOCUMENTS

| 7,126,924 | B2* | 10/2006 | Suzuki et al. ................. 370/311 |
| 7,437,403 | B2* | 10/2008 | Xue et al. ...................... 709/200 |
| 7,680,478 | B2* | 3/2010 | Willars et al. .............. 455/343.2 |
| 7,898,995 | B2* | 3/2011 | Shahidi et al. ................ 370/311 |
| 2009/0124212 | A1* | 5/2009 | Islam et al. ..................... 455/70 |
| 2011/0199984 | A1* | 8/2011 | Umesh et al. ................ 370/329 |

* cited by examiner

*Primary Examiner* — Ping Hsieh
*Assistant Examiner* — Chung-Tien Yang (57) ABSTRACT

A method, a computer readable medium and an apparatus for providing a dynamic inactivity timer are disclosed. For example, the method monitors a timer for a time threshold associated with a burst of a plurality of bursts of packets, and determines if the timer for the time threshold associated with the burst has expired. The method predicts an inter-burst time for the burst, if the timer for the time threshold associated with the burst has expired and sets the dynamic inactivity timer in accordance with the inter-burst time for the burst.

20 Claims, 6 Drawing Sheets

METHOD AND APPARATUS FOR PROVIDING A DYNAMIC INACTIVITY TIMER IN A WIRELESS COMMUNICATIONS NETWORK

The present disclosure relates generally to communication networks and, more particularly, to a method and apparatus for providing a dynamic inactivity timer in a wireless communications network, e.g., a cellular network.

BACKGROUND

As usage of wireless communication networks, e.g., 3G (third generation) cellular networks, continues to grow, a customer's ability to access and utilize the network depends on the availability of capacity. In order to efficiently utilize the limited radio resources, the cellular network is managed using one or more radio network controllers. For example, the Universal Mobile Telecommunications System (UMTS), which is among the most popular 3G networks, allocates radio resources via a radio resource control (RRC) protocol implemented in radio network controllers.

The radio resource allocation to a user endpoint device is determined based on the state of the device. Hence, as the device transitions from one state to another state, the user endpoint device may be allocated a different amount of radio resource.

However, different service providers use different models for the state transition with varied parameters. For example, one service provider may use a model for the state transitions with an inactivity timer shorter than that used by another service provider. The inactivity timer may be used to determine when a radio resource should be released. A short inactivity timer may have the effect of too many state promotions. A long inactivity timer may have the effect of wasting resources. Hence a static inactivity timer may not be able to accommodate two types of traffic wherein one type has small inter-arrival time and the second type has a long inter-arrival time.

SUMMARY

In one embodiment, the present disclosure describes a method, a computer readable medium and an apparatus for providing a dynamic inactivity timer in a wireless network, e.g., a cellular network. In one embodiment, the method monitors a timer for a time threshold associated with a burst of a plurality of bursts of packets, and determines if the timer for the time threshold associated with the burst has expired. The method predicts an inter-burst time for the burst, if the timer for the time threshold associated with the burst has expired and sets the dynamic inactivity timer in accordance with the inter-burst time for the burst.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method, a computer readable medium and an apparatus for providing a dynamic inactivity timer in a wireless communications network, e.g., a cellular network. Although the present disclosure is described below in the context of a cellular network, the teaching is not so limited. Namely, the teachings of the current disclosure can be applied for other types of networks, wherein resources are allocated based on states and transitions between states.

Figure 1:
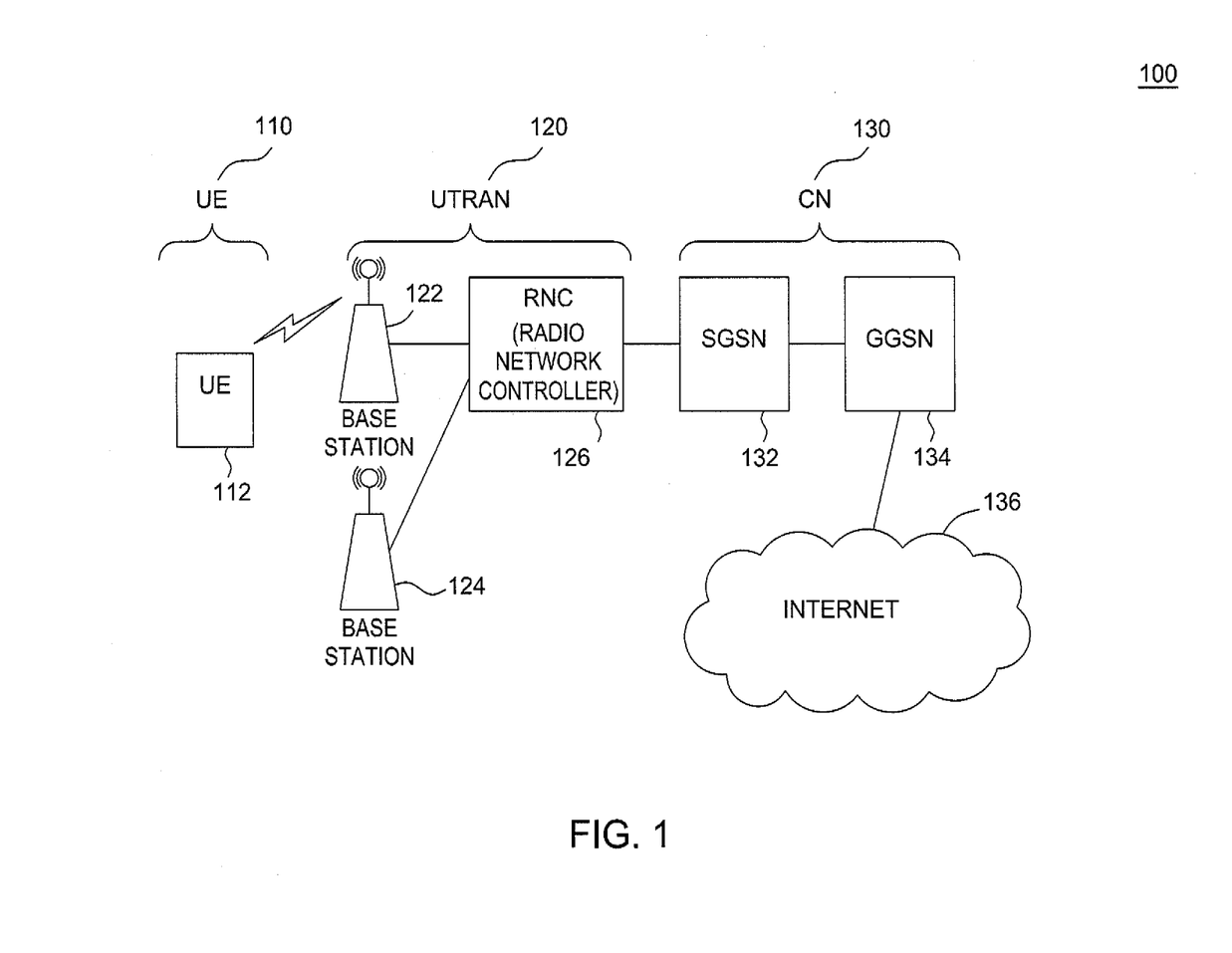
FIG. 1 is a block diagram depicting an illustrative cellular network related to the current disclosure.

FIG. 1 is a block diagram depicting an illustrative cellular network 100 related to the present disclosure. In one embodiment, the cellular network 100 can be a 3G cellular network, e.g., a universal mobile telecommunications system (UMTS) network. However, it should be noted that the cellular network 100 may include other types of cellular networks such as general packet radio services (GPRS) networks, global system for mobile communication (GSM) networks, enhanced data rates for GSM evolution (EDGE) networks, Long Term Evolution (LTE) networks, and so on.

In one embodiment, the network 100 includes three subsystems comprising: a user endpoint (UE) device subsystem 110, a UMTS terrestrial radio access network (UTRAN) subsystem 120 and a core network (CN) 130.

In one embodiment, the UE subsystem 110 includes one or more user endpoint devices 112. The user endpoint devices 112 may include a mobile telephone, a smart phone, a messaging device, a tablet computer, a laptop computer, an air card and the like. The user endpoint devices 112 may communicate wirelessly with the cellular network 100.

In one embodiment, the UTRAN subsystem 120 includes one or more base stations 122 and 124 and a radio network controller (RNC) 126. The UTRAN subsystem 110 provides connectivity between the user endpoint devices 112 and the core network 130. The UTRAN subsystem 120 provides features such as packet scheduling, radio resource control (RRC) and handover control via the RNC 126.

In one embodiment, the core network 130 includes a serving GPRS support node (SGSN) 132, a gateway GPRS support port node (GGSN) 134 in communication with the Internet 136. The GGSN 134 serves as a gateway hiding UMTS internal infrastructures from an external network.

The core network 130 serves as the backbone of the cellular network 100. It should be noted that FIG. 1 is a simplified representation of the network 100 and is not intended to illustrate all of the components of the network 100. For example, although two base stations 122 and 124 are illustrated, the network 100 may include any number of base stations and so on. Moreover, the cellular network 100 may also include additional hardware or network components that are not illustrated. In other words, FIG. 1 is an illustration of an exemplary simplified cellular network 100.

In one embodiment, the radio resource allocation to the user endpoint devices is handled via a radio resource control (RRC) functionality implemented in radio network controllers. For the example in FIG. 1, the RRC functionality is implemented in the RNC 126.

In one embodiment, in the context of UMTS, the radio resource refers to three factors that are potential bottlenecks of the network: the frequency spectrum, the WCDMA code space, and the UTRAN transmission power. It is important to note that the radio resource usage, device energy consumption and user experiences are all based on the state of the user endpoint device. To efficiently utilize the limited radio resources, the RRC protocol introduces a state machine associated with each user endpoint device. The allocated radio resource for a user endpoint device is then determined based on its state (RRC state).

In order to more clearly illustrate the teachings of the current disclosure, the RRC states will first be described. RRC states are used to allocate radio resources, with each state being associated with a different amount (or level) of the resource. For example, if there are only two states, one state may be associated with allocating zero resources while the second state may be associated with allocating a maximum resource level. In another example, there may be eleven states with each state associated with zero to 100% of a resource level (e.g., 0%, 10%, 20%, . . . , 100%). The RRC states may then be any number of states with each state associated with a resource level. In one embodiment, the resource levels may be assigned according to a service provider's preference.

In one embodiment, the RRC state machine comprises three states used in UMTS cellular networks. The three RRC states are: an IDLE state, a CELL_DCH state and a CELL_FACH state, as described below. It should be noted that the teachings of the current disclosure can be applied in other networks with different RRC state machines. As such, the embodiment as applied and described below for UMTS cellular networks is not intended to limit the scope or applicability of the current disclosure.

In one embodiment, the IDLE state refers to a default state of the user endpoint device when the user endpoint device is turned on. The user endpoint device in the IDLE state has not established an RRC connection with the RNC, thus no radio resource is allocated to the user endpoint device. A user endpoint device in the IDLE state cannot transfer any data. However, it is allowed to send control messages through a shared control channel for initializing an RRC connection. A user endpoint device in the IDLE state consumes little to no energy.

In one embodiment, the CELL_DCH refers to a state wherein the RRC connection with the RNC is established and the user endpoint device is allocated dedicated transport channels in both downlink (RNC to user endpoint device) and uplink (user endpoint device to RNC) directions. The CELL_DCH state allows the user endpoint device to fully utilize the radio resources for user data transmission. The user endpoint device can access the network in HSPA (High Speed Packet Access) mode, if the network infrastructure supports HSPA. CELL_DCH may also be referred to as DCH. A user endpoint device in the CELL_DCH state has the highest amount of energy consumption and the maximum bandwidth.

In one embodiment, CELL_FACH refers to a state wherein the RRC connection is established with the RNC, but there is no dedicated channel allocated to the user endpoint device. Instead, the user endpoint device can only transmit user data through shared low-speed channels (RACH for the uplink and FACH for the downlink). CELL_FACH may also be referred to as FACH. FACH is designed for applications requiring very low data throughput rate. A user endpoint device in CELL_FACH state consumes a lower level of energy and provides a lower level of access, e.g., less than ten Kbps. For example, the energy consumption associated with the CELL_DCH state may be 50%-100% higher than that associated with the CELL_FACH state.

It is important to note that the RRC state machine is maintained at both the user endpoint device and the RNC. The two peer entities are always synchronized via control channels except during transient and error situations. Also note that both the downlink and the uplink use the same state machine.

Transitions between the above states (state transitions) are determined by the user endpoint device's data transmission behavior. As such, the user endpoint device may be allocated a different amount of radio resource as the user endpoint device transitions from one state to another state.

In one embodiment, the RRC state machine provides two types of state transitions: state promotions and state demotions.

State promotions include the state transitions: from IDLE state to CELL_FACH state (IDLE→FACH), from IDLE state to CELL_DCH state (IDLE→DCH), and from CELL_FACH state to CELL_DCH state (FACH→DCH). The state transition for a promotion involves switching from a first state with lower radio resource allocation and lower user endpoint device energy consumption to a second state with more radio resource consumption and more user endpoint device energy consumption.

State demotions include the state transitions: from CELL_DCH state to CELL_FACH state (DCH→FACH), from CELL_FACH state to IDLE state (FACH→IDLE), and from CELL_DCH state to IDLE state (DCH→IDLE). The state transition for a demotion involves switching from a first state with higher radio resource allocation and higher user endpoint device energy consumption to a second state with lower (or no) radio resource consumption and lower (or no) user endpoint device energy consumption.

Depending on the starting state, a state promotion is triggered by either any user data (as opposed to control data) transmission activity, if the user endpoint device is at IDLE, or the per-user endpoint device queue size (called RLC (Radio Link Controller) buffer size) exceeding a threshold in either the uplink or downlink direction, if the user endpoint device is at CELL_FACH.

In one embodiment, the state demotions are triggered by two inactivity timers maintained by the RNC. Let, $\alpha$ denote the inactivity timer for the state demotion DCH→FACH and let $\beta$ denote the inactivity timer for the state demotion FACH→IDLE. If the state demotion DCH→IDLE exists, an inactivity timer for the DCH→IDLE may also be defined.

To illustrate the usage of inactivity timers, assume that the inactivity timer $\alpha$ is set to a predetermined fixed threshold, e.g., T seconds, Whenever the RNC observes any uplink or downlink data frame while the RNC is at the CELL_DCH state, the RNC may then reset the inactivity timer. If there is no user data transmission activity for T seconds, the inactivity timer times out and the state of the user endpoint device is demoted to EACH. A similar scheme may be used for the $\beta$ timer and the inactivity timer associated with the demotion DCH→IDLE, if applicable.

Different service providers may use different models for the state transitions. In one example, one service provider may allow transitions from the IDLE state to the CELL_DCH state directly, while another server provider allows transition from the IDLE state only to the CELL_FACH state. In order to more clearly illustrate the current method, two exemplary RRC state machines will first be described.

Figure 2:
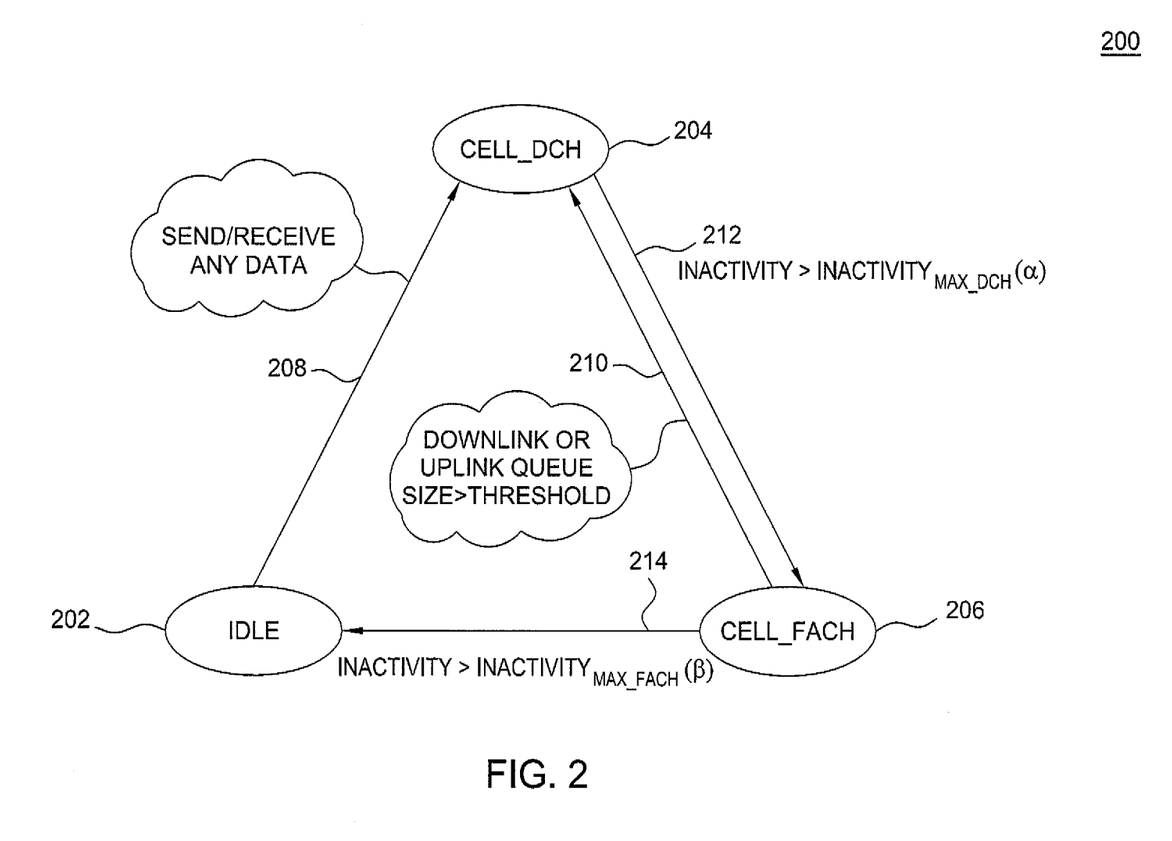
FIG. 2 illustrates a first exemplary RRC state machine implemented in an RNC.

FIG. 2 illustrates a first exemplary RRC state machine 200 implemented in an RNC, e.g., the RNC 126. The RRC state machine 200 comprises three states: an IDLE state 202, a CELL_DCH state 204 and a CELL_FACH state 206, in accordance with the descriptions of the various states described above.

For example, if the RRC state machine is in the IDLE state 202 and any data is sent or received, a promotion may occur to the CELL_DCH state 204. This is illustrated by line 208. Alternatively, if the RRC state machine is in the CELL_FACH state 206 and the downlink or uplink queue size is greater than a predetermined threshold, a promotion may occur to the CELL_DCH state 204. This is illustrated by line 210.

Similarly, for the demotions, if the RRC state machine is in the CELL_DCH state 204 and the amount of inactivity time exceeds a maximum inactivity time $\alpha$ (or $INACTIVITY_{MAX\_DCH}$) then a demotion may occur to the CELL_FACH state 206. This is illustrated by line 212. For example, if $\alpha$ is set to 5 seconds and there is no user data transmission activity for 5 seconds, the RRC state associated with the user endpoint device is demoted from the CELL_DCH state 204 to CELL_FACH state 206. Alternatively, if the RRC state machine is in the CELL_FACH state 206 and the amount of inactivity time exceeds a maximum inactivity time $\beta$, (or $INACTIVITY_{MAX\_FACH}$) then a demotion may occur to the IDLE state 202. This is illustrated by line 214. For example, if $\beta$ is set to 12 seconds and there is no user data transmission activity for 12 seconds, the RRC state associated with the user endpoint device is demoted from the CELL_FACH 206 state to the IDLE state 202.

Figure 3:
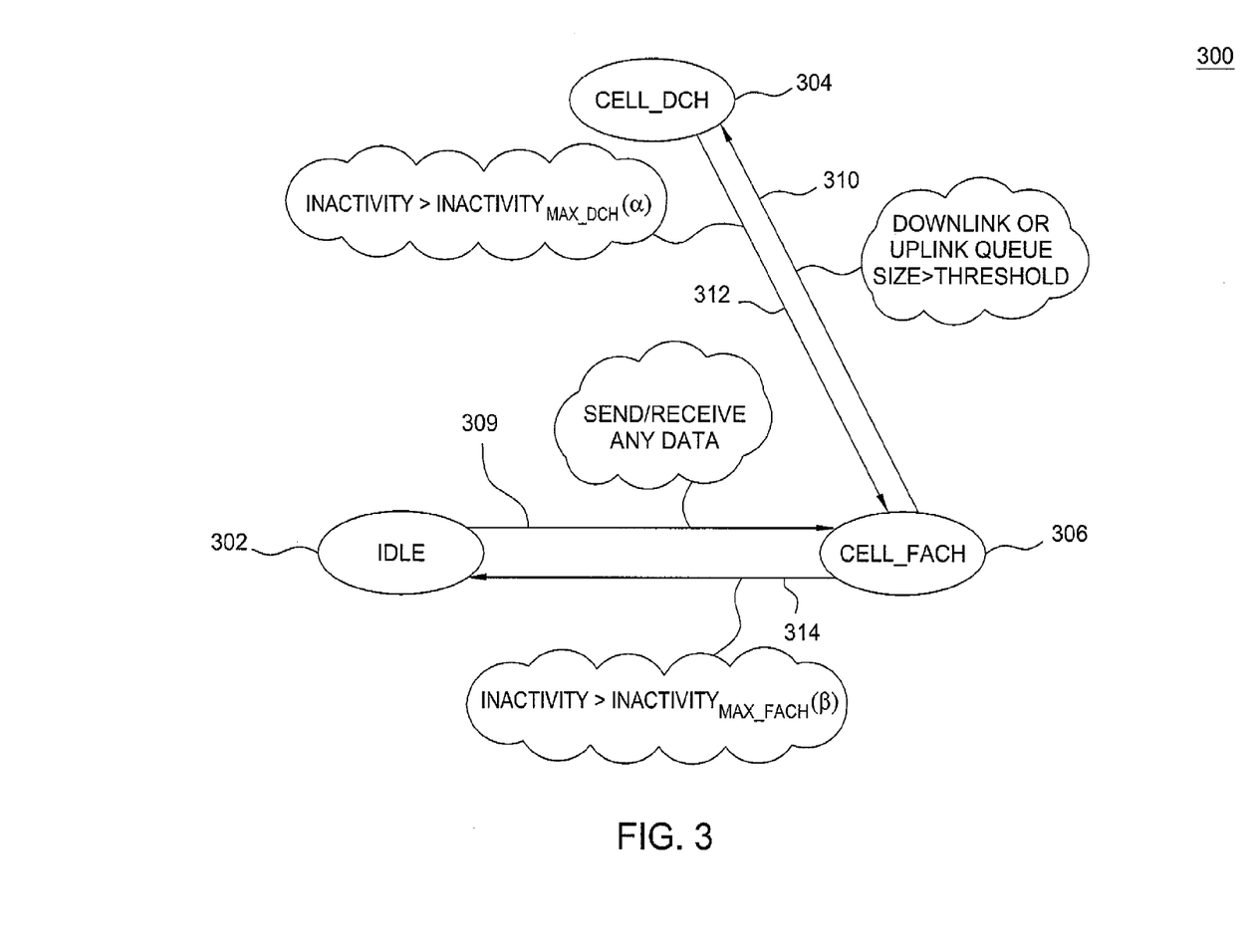
FIG. 3 illustrates a second exemplary RRC state machine implemented in an RNC.

FIG. 3 illustrates a second exemplary RRC state machine 300 implemented in an RNC, e.g., the RNC 126. The RRC state machine 300 comprises three states: an IDLE state 302, a CELL_DCH state 304 and a CELL_FACH state 306, in accordance with the descriptions of the various states described above.

For example, if the RRC state machine is in the IDLE state 302 and any data is sent or received, a promotion may occur to the CELL_FACH state 306. This is illustrated by line 309. Alternatively, if the RRC state machine is in the CELL_FACH state 306 and the downlink or uplink queue size is greater than a predetermined threshold, a promotion may occur to the CELL_DCH state 304. This is illustrated by line 310.

Similarly, for the demotions, if the RRC state machine is in the CELL_DCH state 304 and the amount of inactivity time exceeds a maximum inactivity time a (or $INACTIVITY_{MAX\_DCH}$) then a demotion may occur to the CELL_FACH state 306. This is illustrated by line 312. For example, if a is set to 5 seconds and there is no user data transmission activity for 5 seconds, the RRC state associated with the user endpoint device is demoted from the CELL_DCH state 304 to CELL_FACH state 306. Alternatively, if the RRC state machine is in the CELL_FACH state 306 and the amount of inactivity time exceeds a maximum inactivity time 13, (or $INACTIVITY_{MAX\_FACH}$) then a demotion may occur to the IDLE state 302. This is illustrated by line 314. For example, if $\beta$ is set to 12 seconds and there is no user data transmission activity for 12 seconds, the RRC state associated with the user endpoint device is demoted from the CELL_FACH 306 state to the IDLE state 302.

It should be noted that the CELL_DCH inactivity timer and the CELL_FACH inactivity timer may be set to any time period. The specific inactivity times are provided only as examples and should not be considered limiting.

It should be noted that the RRC state machines 200 and 300 are only exemplary RRC state machines used in a cellular network. The embodiments of the present disclosure may be equally applicable to other variations of RRC state machines.

It should also be noted that state machine promotions and demotions increase the management overhead of the RNC and worsen the user experience. Furthermore, state promotions involve more work (more processing time cycles) than demotions. In particular, state promotions incur ramp-up latency (e.g., two seconds), during which several control messages are exchanged between the user endpoint device and the RNC for resource allocation (e.g., radio bearer reconfiguration and RRC connection setup). Hence, excessive state promotions and demotions increase the management overhead at the RNC and degrade user experience.

As described above, the inactivity timers are used to determine when a radio resource should be released for re-use by others. One way to reduce the management overhead caused by state machine promotions and demotions is to increase the values of the inactivity timers (e.g., $\alpha$ and $\beta$). However, increasing the values of the inactivity times decreases the radio resource utilization. For example, if the RRC state machine is in the CELL_DCH and there is no user data transmission activity for a time period before the RRC state of the user endpoint device is demoted to the IDLE state, the resource which was allocated to the particular user endpoint device remains unused. This effect on utilization may be referred to as tail effect. The tail may be defined as a time period of a constant duration of an inactivity time before a state demotion. The tail time period can never be used to transfer user data, otherwise the new traffic would have reset the timer and there would not have been a demotion. Hence, in order to optimize resource allocations there is a tradeoff among various considerations that comprise: radio resource utilization, end user experience, management overhead and energy consumption.

A short inactivity timer may cause excessive state promotions and demotions, while a long inactivity timer may waste resources. For example, given two traffic patterns A and B: A's inter-arrival times (as described below) of most packets are so small that the state stays in CELL_DCH; B's inter-arrival times are long enough so performing timely state demotion saves radio resources without introducing additional state promotions. Hence, a state machine that treats the two patterns A and B according to the same inactivity timer either wastes resources or has too many state promotions and demotions.

In order to more clearly illustrate the teachings of the current disclosure, the following data analysis terminologies will first be described.

Inter-Arrival Time (IAT);
Burst;
Complete burst; and
Inter-Burst time.

In one embodiment, inter-arrival time (IAT) refers to the time between consecutive arrivals. For example, for the data packets, the inter-arrival time refers to the time between consecutive arrivals of packets.

In one embodiment, burst refers to consecutive packets of data whose inter-arrival times are less than a time period threshold $\delta$, wherein the packets of data are combined from both uplink and downlink directions. For example, the threshold $\delta$ may be set to one second, two seconds, etc.

In one embodiment, complete burst refers to a condition wherein a time period of $\delta$ has passed since the last packet for a particular burst was observed. For example, a complete burst $B_i$, refers to a time greater than $\delta$ wherein the last packet for the burst has been received.

In one embodiment, inter-Burst time (IBT) refers to a time between consecutive bursts.

In one embodiment, the current method accommodates different types of traffic using dynamic inactivity timers. The method dynamically adjusts the inactivity timers based on predicted inter-burst times. For example, the inter-burst times may be predicted from recent traffic behavior via a machine-learning technique. If the predicted inter-burst time of packets is sufficiently long, the radio resource can be quickly released. For the example above, if the two patterns A and B are distinguishable, the inactivity timer setting may be set dynamically by selecting a smaller inactivity timer for pattern B as compared to that of pattern A.

In one embodiment, the method first obtains inter-arrival time data to be used for training the machine. For example, the method may collect inter-arrival times on a per-UE basis. The inter-arrival times are then available for performing the machine learning.

In one embodiment, the method performs the machine learning at the RNC in a global manner. For example, the learning may be performed based on data collected from all UEs such that the result is applicable to each UE whose data was included in the learning process. Global manner refers to the machine learning being performed on a set of UEs rather than on a per-UE basis.

In one embodiment, the method then predicts the inter-burst time. For example, if the RNC is in the CELL_DCH state, the method observes the packets to determine when a complete burst is observed. For example, if the complete burst observed is $B_i$, the method predicts the inter-burst time to be between $B_i$ and $B_{i+1}$.

In one embodiment, the method then determines if the inter-burst time is greater than $\alpha$ (the CELL_DCH→CELL_FACH inactivity timer). If the inter-burst time is greater than $\alpha$, the state of the UE is immediately demoted to CELL_FACH to save CELL_DCH tail time. The immediate demotion is equivalent to setting the inactivity timer to zero. If the inter-burst time is not greater than $\alpha$, the method sets the inactivity timer to $\alpha$. For example, this approach may be used to balance the overhead of any additional promotion, if it exists, against the savings achieved by reducing CELL_DCH tail time.

In one embodiment, the RNC makes customized decisions for each UE. Note that the RNC maintains a state machine for each UE regardless of whether the machine learning is performed globally at the RNC, on a per-UE basis, or on a per-application basis.

Figure 4:
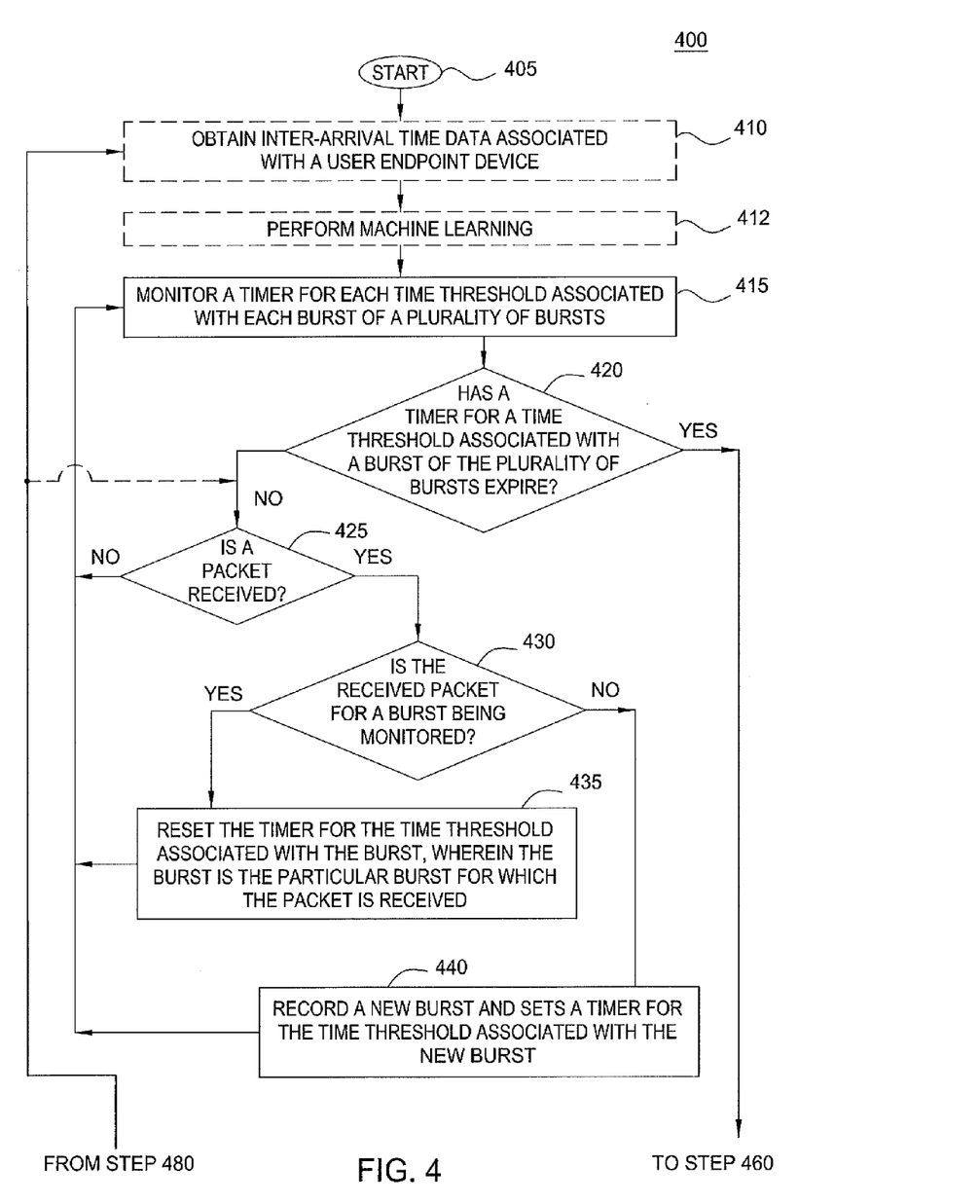
FIG. 4 illustrates a flowchart of a method for providing a dynamic inactivity timer.

FIG. 4 illustrates a flowchart of a method 400 for providing a dynamic inactivity timer. In one embodiment, the method 400 may be implemented in a radio network controller (RNC), a user endpoint device, or a general purpose computer having a processor, a memory and input/output devices as discussed below in reference to FIG. 5. The method 400 starts in step 405 and proceeds to step 410.

In optional step 410, method 400 obtains inter-arrival time data to be used for machine learning purposes. For example, the method may collect inter-arrival times on a per-UE basis. The inter-arrival times are then available for performing the machine learning.

In optional step 412, method 400 performs machine learning. For example, the learning may be performed in a global manner based on the data collected from all UEs such that the result is applicable to each UE.

In step 415, method 400 monitors a timer for each time threshold associated with each burst of a plurality of bursts. For example, the method may monitor a timer for each time threshold period $\delta$. Note that each burst has its own time threshold period $\delta$ and a timer is set for each $\delta$.

In step 420, method 400 determines if a timer for a time threshold associated with a burst of the plurality of bursts has expired. For example, the time threshold $\delta$ may have passed for one of the bursts being monitored. If a timer for at least one time threshold associated with a burst has expired, the method proceeds to step 460. Otherwise, the method proceeds to step 425.

In step 425, method 400 determines if a packet is received. For example, the method may receive one or more packets wherein the one or more packets may be associated with a new burst or a burst already being monitored. If there are no packets received, the method proceeds to step 415 to continue monitoring timers associated with bursts. Otherwise, the method proceeds to step 430.

In step 430, method 400 determines if the received packet is for a burst being monitored. If the packet is for a burst being monitored, the method proceeds to step 435. Otherwise, the method proceeds to step 440.

In step 435, method 400 resets the timer for the time threshold associated with the burst, wherein the burst is the particular burst for which the packet is received. For example, if the packet is part of a burst to/from a particular UE, the method resets the timer for the burst to/from the particular UE. The method then proceeds to step 415.

In step 440, method 400 records a new burst and sets a timer for the time threshold associated with the new burst. For example, the method sets a timer such that the new burst may be monitored. The method then proceeds to step 415.

In step 460, method 400 predicts an inter-burst time for the burst whose timer for the time threshold expired, based on historically observed bursts. For example, if the time when the complete burst was observed is $B_i$, the method predicts the inter-burst time to be between $B_i$ and $B_{i+1}$, wherein $B_i$ is greater than the time threshold that expired and $B_{i+1}$ is a time period at which the next monitoring would be performed. For example, if the monitoring is done every 0.1 seconds and $\delta$ is one second, the inter-burst time may be predicted as being between 1 and 1.1 seconds. The method then proceeds to step 465.

In step 465, method 400 determines if the predicted inter-burst time is greater than an inactivity timer for transitioning from a first state to a second state, wherein the first state is associated with a first level of radio resource, wherein the second state is associated with a second level of radio resource, wherein the first level of radio resource is larger than the second level of radio resource. If the predicted inter-burst time is greater than the inactivity timer for transitioning from the first state to the second state, the method proceeds to step 475. Otherwise, the method proceeds to step 470.

In step 470, method 400 sets or resets the dynamic inactivity timer to the value of the inactivity time for transitioning from the first state to the second state. For example, the value of $\alpha$ (the CELL_DCH→CELL_FACH inactivity timer) may be 5 seconds. If the inter-burst time is larger than 5 seconds, the inactivity timer for the burst remains at 5 seconds to prevent immediate demotion from the CELL_DCH state to the CELL_FACH state. The method then proceeds to step 480.

In step 475, method 400 sets or resets the value of the dynamic inactivity timer to zero. Setting the inactivity timer to zero has the effect of immediate demotion from the first state to the second state. For example, when the inactivity timer is set to zero, the UE may be immediately demoted from the CELL_DCH state to the CELL_FACH state. The method then proceeds to step 480.

In optional step 480, method 400 stores the value of the dynamic inactivity timer and predicted inter-burst times, for future use in predicting inter-burst times. The method then proceeds to either step 485 to end dynamically setting the inactivity timers, to step 410 to obtain more data, or to step 425 to determine if a packet is received.

Note that the steps of method 400 may be performed in parallel, in series or in a combination. As such, the specific order of the steps above is not intended to limit the implementation or use of the current disclosure to the embodiment illustrated in FIG. 4. For example, in one embodiment, method 400 performs the monitoring to determine if a timer for a burst has expired while also checking if a packet is received.

One challenge in predicting the above inter-burst times is accuracy. Inter-burst time depends on multiple factors such as user behavior, network latency, server responsiveness, and presence of concurrent applications. Another challenge is that the prediction methodology needs to be lightweight to reduce excessive requirements for computations.

In one embodiment, the current method uses a lightweight machine learning technique to predict inter-burst times based on historically observed bursts. In order to describe the lightweight machine learning technique, first let the input and output be defined as follows:

Let the input be a packet stream $\{P_i\}$ and the output be the prediction sequence $\{B_j \in \{S,L\}\}$ where S and L correspond to a short inter-burst time (duration $\leq \alpha$) and a long inter-burst time (duration $> \alpha$), respectively.

Then, the learning-prediction procedure operates in several phases, each consisting of consecutive W packets passing through the RNC. At phase k, the RNC uses the learning model generated from phase k−1 to predict the inter-burst time. Simultaneously, the method accumulates the training data to be used to train a new model for phase k+1 when phase k is completed.

Then, assume that at a certain phase, the RNC observes a packet at time $t_0$. Assume also that no new packet has yet arrived at time $t_0+\delta$. Thus, the observation indicates the current burst has terminated. The RNC then extracts a feature vector $\bar{v}=(f_1, \ldots, f_k)$ used in the model to predict the inter-burst time, and dynamically adjusts the inactivity timer based on $\tilde{B} \in \{S,L\}$ the prediction result.

Suppose, at time $t_1 > t_0+\delta$, the next packet (for the same UE) finally arrives. Therefore, the RNC knows the true value of inter-burst time $B \in \{S, L\}$ wherein B=L if and only if $t_1-t_0 > \alpha$. The RNC thus obtains a training record $(\bar{v},B)$. The routine is repeated until the phase is completed. That is, the routine is repeated until up to W packets have traversed through the RNC. Then, the RNC uses all training data to build a model for predicting inter-burst times in the next phase.

In the above prediction of the inter-burst times, the current method utilizes a decision tree as a classifier of the inter-burst times. In one embodiment, the prediction may be based on one or more of the following eight features that characterize inter-burst times. The features are summarized below in Table 1.

TABLE 1

Features used for inter-arrival time prediction

| Feature No. | Feature |
| --- | --- |
| $f_1$ | Size of the last packet in the current burst |
| $f_2$ | The previously observed inter-burst time |
| $f_3$ | Inter-arrival time between the last packets in the previous and current bursts |
| $f_4$ | Number of bytes transferred in the past n seconds (e.g., 10 sec) |
| $f_5$ | Number of bytes observed in the current session |

TABLE 1-continued

Features used for inter-arrival time prediction

| Feature No. | Feature |
| --- | --- |
| $f_6$ | The direction (uplink/downlink) of the last packet in the current burst |
| $f_7$ | The number of bursts observed so far |
| $f_8$ | The percentage of short (S) inter-burst times observed so far |

The above features capture both properties of packet dynamics and properties of historically observed inter-burst times. In one embodiment, the packet dynamics comprise timing, volume and direction.

It should be noted that some features (e.g., $f_4$) may not always be available. However, the decision tree algorithm handles missing values in the feature vector. In one embodiment, when building the tree, the method may implement a diversity index as the criterion for choosing a split. Some examples of diversity indices that may be used are Gini's diversity index, Simpson's diversity index, Shannon's diversity index, Berger-Parker diversity index, etc. The generated tree may then be pruned, e.g., via a 5-fold cross validation technique.

In one embodiment, the above machine learning is performed for each UE or for each application. For example, the prediction may be more accurate if the learning is performed on a UE basis, on an application basis, or a combination thereof. Hence, in order to increase accuracy of the prediction, the method may perform the machine learning on a UE basis, on an application basis, or a combination thereof.

In one embodiment, traffic patterns for different applications are automatically discovered by the learning model at the RNC. For example, the machine learning may be performed globally and traffic patterns for different applications may be discovered based on the machine learning performed globally.

In one embodiment, if the machine learning is performed on a UE basis, on an application basis, or a combination thereof, the method also takes into account the additional overhead incurred at the RNC for classifying packets on a UE basis, on an application basis, or a combination thereof, as applicable.

In one embodiment, if the machine learning is performed on a UE basis, on an application basis, or a combination thereof, the method takes into account whether sufficient training data is available for classifying on a UE basis, on an application basis, or a combination thereof, as applicable.

In one embodiment, if the machine learning is performed on a UE basis, on an application basis, or a combination thereof, the method also takes into account if the results have scalability concerns due to lack of sufficient data for classifying on a UE basis, on an application basis, or a combination thereof, as applicable.

In one embodiment, the method performs the above machine learning, obtaining inter-arrival time data, and/or storing of the inactivity timers for future use in a pre-determined schedule. For example, the machine learning may be performed after data has been collected for several cycles of updates of the inter-burst times rather than a continuous learning. In another embodiment, the method determines whether the machine learning should be performed based on the amount of new data available since the last machine learning cycle. For example, the inter-burst times may be predicted based on historical observations of burst accrued over a pre-determined length of time.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIG. 4 that recite a determining operation, or involve a decision, do not necessarily require that both branches of the determining operation be practiced. In other words, one of the branches of the determining operation can be deemed as an optional step.

Figure 5:
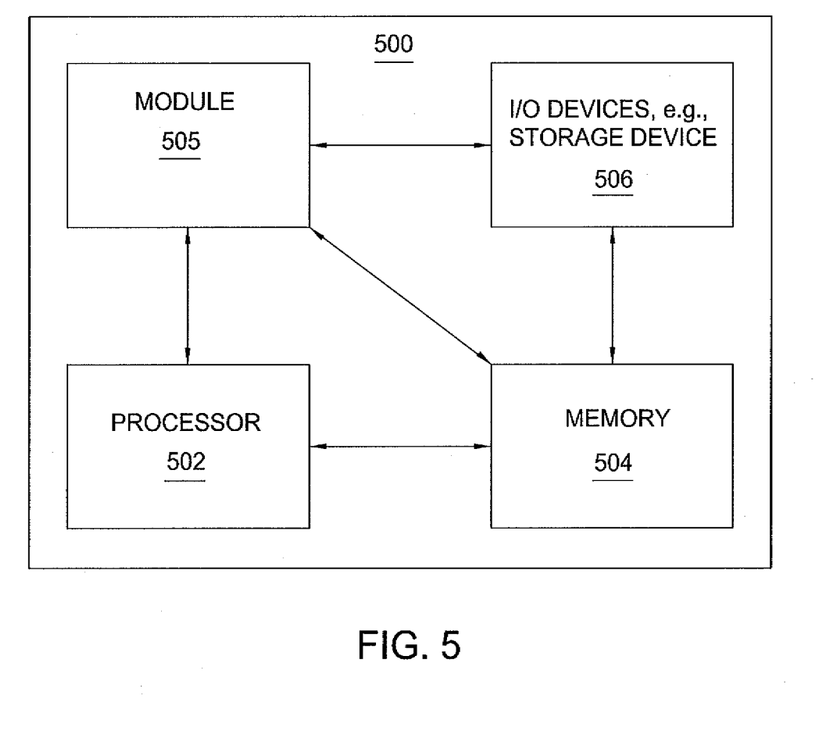
FIG. 5 illustrates a high-level block diagram of a general-purpose computer suitable for use in performing the functions described herein.

FIG. 5 depicts a high-level block diagram of a general-purpose computer readable medium suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing a dynamic inactivity timer in a network, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 505 for providing a dynamic inactivity timer in a network can be loaded into memory 504 and executed by processor 502 to implement the functions as discussed above. As such, the present method 505 for providing a dynamic inactivity timer in a network (including associated data structures) of the present disclosure can be stored on a non-transitory computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a dynamic inactivity timer in a network, comprising:
    monitoring, by a processor, a timer for a time threshold associated with a burst of a plurality of bursts of packets;
    determining, by the processor, if the timer for the time threshold associated with the burst has expired;
    predicting, by the processor, an inter-burst time for the burst, when the timer for the time threshold associated with the burst has expired; and
    setting, by the processor, the dynamic inactivity timer in accordance with the inter-burst time for the burst, wherein the setting the dynamic inactivity timer comprises determining if the inter-burst time is greater than an inactivity timer for transitioning from a first state to a second state, wherein the first state is associated with a first level of radio resource, wherein the second state is associated with a second level of radio resource, wherein the first level of radio resource is larger than the second level of radio resource.

2. The method of claim 1, further comprising:
    receiving a packet;
    determining if the packet is for the burst;
    resetting the timer for the time threshold associated with the burst, when the packet is for the burst; and
    recording a new burst and setting a second timer for a second time threshold associated with the new burst, when the packet is not for the burst.

3. The method of claim 1, wherein the setting the dynamic inactivity timer further comprises:
    setting the dynamic inactivity timer to a value of the inactivity time for transitioning from the first state to the second state, when the predicted inter-burst time is not greater than the inactivity timer for transitioning from the first state to the second state; and
    setting the dynamic inactivity timer to zero, when the inter-burst time is greater than the inactivity timer for transitioning from the first state to the second state.

4. The method of claim 1, wherein the first state is a cell_dch state.

5. The method of claim 1, wherein the second state is a cell_fach state.

6. The method of claim 3, further comprising:
    storing a value of the dynamic inactivity timer.

7. The method of claim 3, further comprising:
    storing a value of the predicted inter-burst time.

8. The method of claim 1, wherein the setting the dynamic inactivity timer is performed on a per user endpoint device basis.

9. The method of claim 1, further comprising:
    obtaining inter-arrival time data associated with a user endpoint device; and
    performing machine learning based on the inter-arrival time data.

10. The method of claim 9, wherein the performing the machine learning is performed at a radio network controller.

11. The method of claim 9, wherein the performing the machine learning is based on data collected from a plurality of user endpoint devices.

12. The method of claim 9, wherein inter-arrival time data is obtained on a per user endpoint device basis.

13. The method of claim 1, wherein the predicting the inter-burst time is performed by utilizing a decision tree as a classifier of inter-burst times.

14. The method of claim 13, wherein the decision tree is based on a feature that characterizes inter-burst times.

15. A non-transitory computer-readable medium storing a plurality of instructions which, when executed by a processor, cause the processor to perform operations for providing a dynamic inactivity timer in a network, the operations comprising:
    monitoring a timer for a time threshold associated with a burst of a plurality of bursts of packets;
    determining if the timer for the time threshold associated with the burst has expired;
    predicting an inter-burst time for the burst, when the timer for the time threshold associated with the burst has expired; and
    setting the dynamic inactivity timer in accordance with the inter-burst time for the burst, wherein the setting the dynamic inactivity timer comprises determining if the inter-burst time is greater than an inactivity timer for transitioning from a first state to a second state, wherein the first state is associated with a first level of radio resource, wherein the second state is associated with a second level of radio resource, wherein the first level of radio resource is larger than the second level of radio resource.

16. The non-transitory computer-readable medium of claim 15, further comprising:
receiving a packet;
determining if the packet is for the burst;
resetting the timer for the time threshold associated with the burst, when the packet is for the burst; and
recording a new burst and setting a second timer for a second time threshold associated with the new burst, when the packet is not for the burst.

17. The tangible non-transitory computer-readable medium of claim 16, wherein the setting the dynamic inactivity timer further comprises:
setting the dynamic inactivity timer to a value of the inactivity time for transitioning from the first state to the second state, when the predicted inter-burst time is not greater than the inactivity timer for transitioning from the first state to the second state; and
setting the dynamic inactivity timer to zero, when the inter-burst time is greater than the inactivity timer for transitioning from the first state to the second state.

18. The non-transitory computer-readable medium of claim 15, wherein the first state is a cell_dch state.

19. The tangible non-transitory computer-readable medium of claim 15, wherein the second state is a cell_fach state.

20. An apparatus for providing a dynamic inactivity timer in a network, comprising:
a processor; and
a computer-readable medium storing a plurality of instructions which, when executed by the processor, cause the processor to perform operations, the operations comprising:
monitoring a timer for a time threshold associated with a burst of a plurality of bursts of packets;
determining if the timer for the time threshold associated with the burst has expired;
predicting an inter-burst time for the burst, when the timer for the time threshold associated with the burst has expired; and
setting the dynamic inactivity timer in accordance with the inter-burst time for the burst, wherein the setting the dynamic inactivity timer comprises determining if the inter-burst time is greater than an inactivity timer for transitioning from a first state to a second state, wherein the first state is associated with a first level of radio resource, wherein the second state is associated with a second level of radio resource, wherein the first level of radio resource is larger than the second level of radio resource.

* * * * *